No. 737,836. Patented September 1, 1903.

UNITED STATES PATENT OFFICE.

WILLIBALD HENTSCHEL, OF RADEBEUL, GERMANY, ASSIGNOR TO CHEMISCHE FABRIK VON HEYDEN ACTIENGESELLSCHAFT, OF RADEBEUL, GERMANY.

PROCESS OF MAKING INDOXYL AND INDIGO PREPARATIONS.

SPECIFICATION forming part of Letters Patent No. 737,836, dated September 1, 1903.

Application filed June 12, 1902. Serial No. 111,273. (No specimens.)

*To all whom it may concern:*

Be it known that I, WILLIBALD HENTSCHEL, a subject of the Emperor of Russia, and a resident of Radebeul, near Dresden, in the Kingdom of Saxony, German Empire, have invented a new and useful Improvement in Processes of Manufacturing Indoxyl and Indigo Preparations and in Such Preparations, of which the following is a specification.

This invention relates to an improvement in the process of manufacturing indoxyl and indigo preparations from phenylglycin, its homologues, and derivatives.

It is a well-known fact that the formation of indigo from phenylglycin, which results in melting the last-named substance with alkali and which has been first ascertained by Heumann and by von Biedermann and by Lepetit and has been described in the German Patent No. 54,626, fails by an insufficient yield of indigo. Also the addition of an earthy alkali, burnt lime, as described in the German Patent No. 63,310, the British Patent No. 8,726, A. D. 1890, and the French Patent No. 206,567, does not sufficiently increase such yield. The owners of said patents therefore had to replace this simplest way of producing indigo by the more circumstantial way of employing the anthranilic acid. (See German Patent No. 56,273.)

The object of the present invention is to obtain an increased yield of indigo; and to this end my invention consists in heating the phenylglycin or its homologues or derivatives with caustic alkalies in the presence of an alkali-alcoholate and with or without the addition of oxids of the earthy alkalies.

Example I: Five hundred parts of phenylglycin-potassium, six hundred fifty parts of caustic potassa, and two hundred parts of sodium-alcoholate are heated together up to about 250° centigrade. The molten substance is afterward dissolved in water and oxydized with air. The separated indigo is afterward filtered off.

Example II: One hundred parts of hydrate of potassa freed from water and fifty parts of burnt marble are mixed with sodium-alcoholate produced from seven parts of sodium, and to this mixture fifty parts of glycinate of potassa are added so slowly that the temperature of the mixture will not rise beyond 190° centigrade. The formation of indoxyl is completed after the introduction of the glycinate of potassa.

Instead of the phenylglycin there may be employed the homologues and the derivates—such, for instance, as ester, amid, anilid.

What I claim as my invention is—

1. The herein-described process of manufacturing indoxyl and indigo preparations which consists in heating phenylglycin, with caustic alkalies and alkali-alcoholates.

2. The herein-described process of manufacturing indoxyl and indigo preparations which consists in heating phenylglycin, with caustic alkalies, alkali-alcoholates and earthy alkalies.

In testimony that I claim the foregoing as my invention I have signed my name, in presence of two witnesses, this 2d day of June, 1902.

WILLIBALD HENTSCHEL.

Witnesses:
CARL KNOOP,
PAUL E. SCHILLING.